Jan. 19, 1960   C. J. DUMAIS   2,922,027
SWING HEAD ELECTRODE HOLDER
Filed April 15, 1958   3 Sheets-Sheet 1
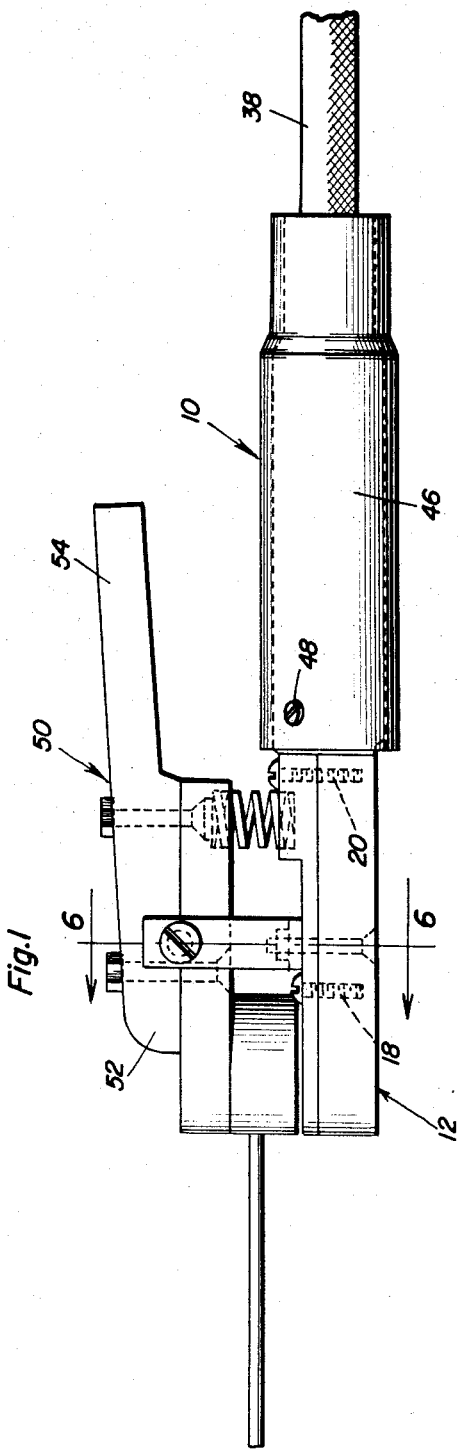
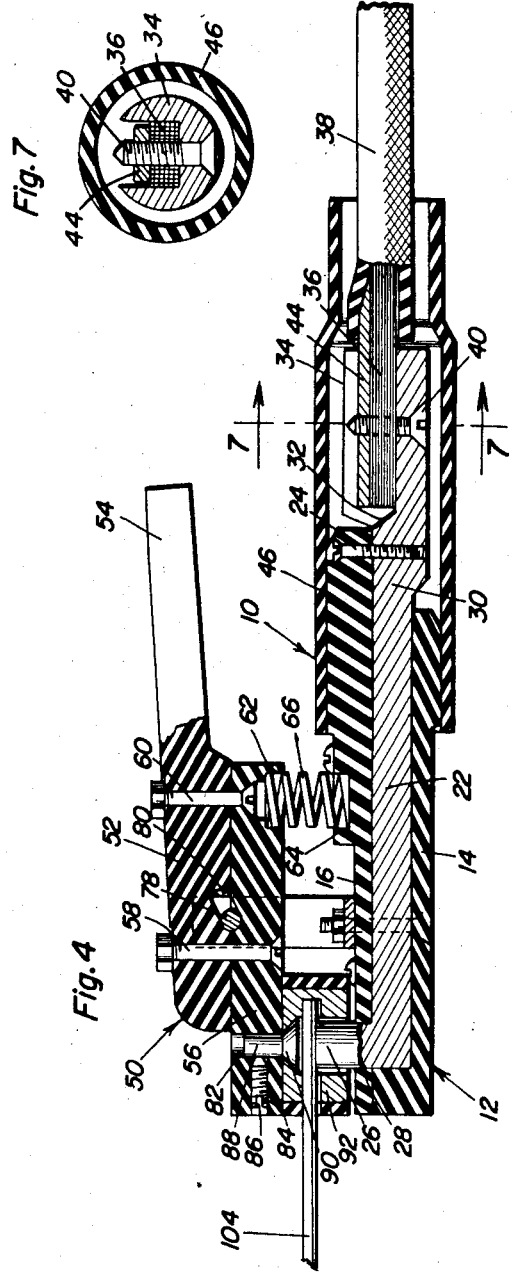
Charles J. Dumais
INVENTOR.
BY *Clarence A. O'Brien*
*and Harvey B. Jackson*
Attorneys Jan. 19, 1960
C. J. DUMAIS
2,922,027
SWING HEAD ELECTRODE HOLDER
Filed April 15, 1958
3 Sheets-Sheet 2
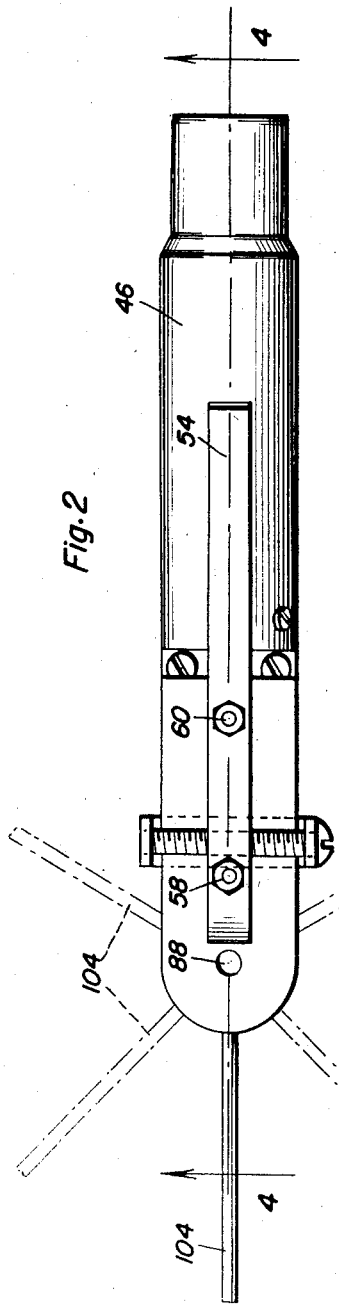
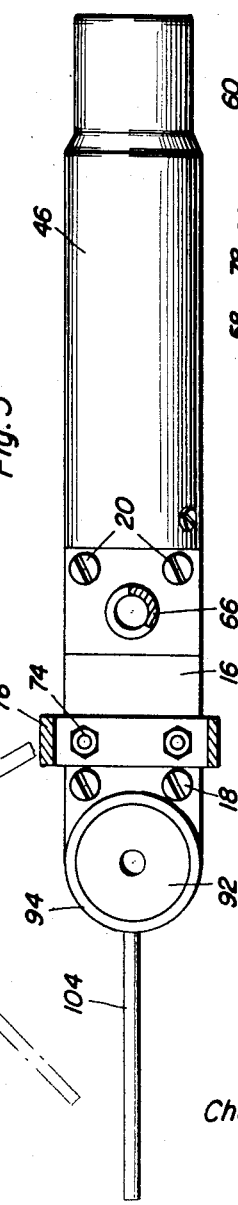
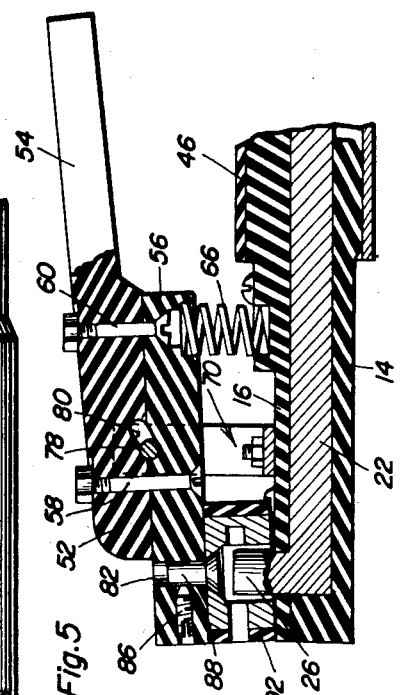
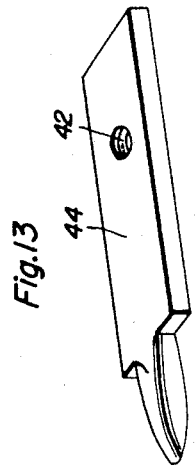
Charles J. Dumais
INVENTOR.
BY *Clarence A. O'Brien*
and *Harvey B. Jacobson*
Attorneys Jan. 19, 1960
C. J. DUMAIS
2,922,027
SWING HEAD ELECTRODE HOLDER
Filed April 15, 1958
3 Sheets-Sheet 3
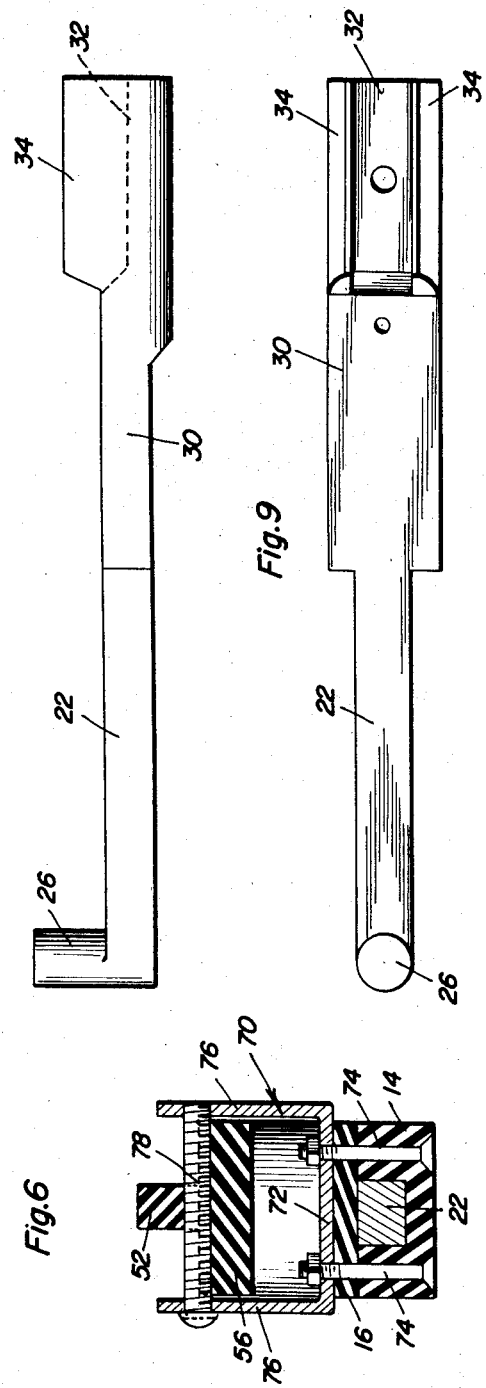
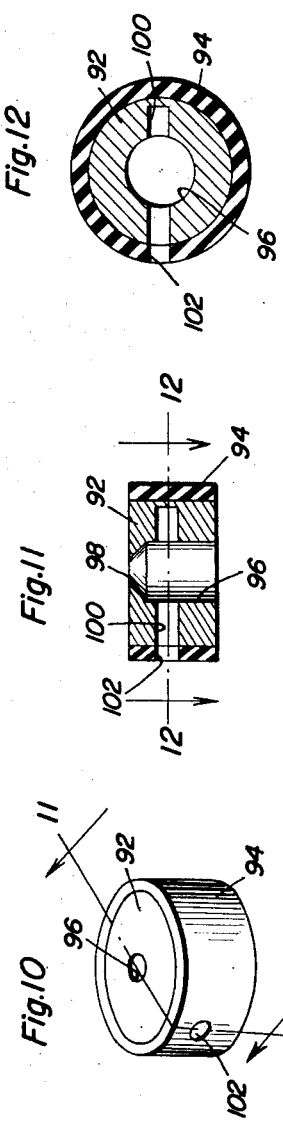
Charles J. Dumais
INVENTOR.
BY

United States Patent Office 2,922,027
Patented Jan. 19, 1960

2,922,027

SWING HEAD ELECTRODE HOLDER

Charles J. Dumais, Woonsocket, R.I.

Application April 15, 1958, Serial No. 728,695

2 Claims. (Cl. 219—138)

This invention comprises a novel and useful swing head electrode holder and more particularly relates to an electrode clamping device for use in arc welding apparatus which will enable the electrode to be selectively placed at various angular positions with respect to the electrode holder.

The primary object of this invention is to provide an electrode holder or clamp which will enable the obtaining of a secure grip or clamping action upon an electrode and also enable the electrode to be disposed at various angular positions with respect to the device to thereby facilitate the use of the electrode in cramped quarters.

A further object of the invention is to provide an improved electrode clamping construction for welding torches which will facilitate the insertion of an electrode into the device and its removal therefrom; and whereby the spring pressure applied to the jaws of the device will not only establish a good electrical contact with the electrode, but will also securely maintain the pivotable electrode holder in adjusted angular position in the jaws of the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a suitable embodiment of a welding torch incorporating therein the principles of this invention and showing an electrode clamped therein for use;

Figure 2 is a top plan view of the arrangement of Figure 1, showing a normal position of the electrode in full lines and showing alternative angularly adjusted positions of the electrode in dotted lines therein;

Figure 3 is a top plan view of the device in accordance with Figure 1, but taken in a horizontal plane below the movable jaw of the device and above the swingable electrode holder carried by the movable jaw;

Figure 4 is a vertical central longitudinal section through the device taken substantially upon the plane indicated by the section line 4—4 of Figure 2;

Figure 5 is a view similar to Figure 4 but of the left hand portion thereof and showing the position of the fixed and movable jaws when the electrode is removed from the same;

Figure 6 is a vertical transverse sectional view taken substantially upon the plane indicated by the section line 6—6 of Figure 1 and showing the pivotal connecting means by which the movable jaw is secured to the stationary or fixed jaw of the device;

Figure 7 is a vertical transverse sectional view taken substantially upon the plane indicated by the section line 7—7 of Figure 4 and showing the manner in which an electric conducting cable is electrically connected to the terminal which is carried by the fixed jaw of the device;

Figure 8 is a side elevational view of the electric terminal which is embedded in or carried by the fixed jaw of the device;

Figure 9 is a top plan view of the terminal of Figure 8;

Figure 10 is a perspective view of the swingable electrode holder of the invention;

Figure 11 is a vertical transverse sectional view taken substantially upon the plane indicated by the section line 11—11 of Figure 10;

Figure 12 is a horizontal sectional detail view taken substantially upon the plane indicated by the section line 12—12 of Figure 11; and Figure 13 is a perspective view of a clamping element by which an electric conductor may be electrically and mechanically secured to the terminal member in the welding torch.

The electric welding torch in which the principles of this invention have been incorporated and which has been illustrated in the accompanying drawings is of a generally conventional type, and by special reference to Figures 1 and 4 it will be seen that the same includes a body designated generally by the numeral 10, and which carries at one end thereof a fixed or stationary jaw designated generally by the numeral 12. As will be seen, the fixed jaw 12 is encased in a casing or housing member 14 of a suitable dielectric material together with an electrically insulating top or cover member 16, these dielectric members being secured together as by fastening screws shown at 18 and 20 in Figures 1 and 3. Received between the insulated members 14 and 16 is a terminal 22 of an electrically conductive material, see Figures 8 and 9, and which is thus embedded in insulating material as will be apparent from Figure 6. Further fastening means such as the screws 24 serve to secure the upper insulating or cover member 16 to the rearward portion of the terminal 22 as shown in Figure 4, while the forward portion of the terminal is provided with an upstanding cylindrical pin or plug comprising an end portion 26 which projects up through an aperture or bore 28 formed in the cover member 16, as shown in Figures 4 and 5, for a purpose to be subsequently set forth.

At its rearward end, the terminal member 22 is provided with a laterally widened portion 30, the latter being provided upon its upper surface with a longitudinally extending channel 32 having side walls 34. The end portion 36 of an insulated electric cable 38 by which current is supplied to the welding torch is received in this channel 32 and is retained therein and electrically connected to the terminal 22 by means of a screw 40 which is threaded through the lower portion of the terminal and extends upwardly through the channel, and in turn is received in the internally threaded bore 42 of a clamping plate 44, see Figure 13, which lies within the side walls 34 of the channel and thereby serves to both clamp the conductor to the terminal and to electrically connect the same therewith.

A tubular dielectric sleeve or bushing 46 surrounds and embraces this connection of the conductor 38 to the terminal 22, and is retained upon the body as by fastening screws 48.

Cooperating with the fixed jaw 12 is a movable jaw indicated generally by the numeral 50. The movable jaw is also of a dielectric material, and comprises a head portion 52 together with a handle 54 extending therefrom and overlying the body 12 and the insulating sleeve 46 to provide a means for manually operating the jaws as set forth hereinafter.

Secured to the underside of the head 52 of the movable jaw is a block 56 of dielectric material, and which is retained on the head 52 as by the fasteners 58 and 60. This block is provided with a recess 62 upon its undersurface, which is in vertical alignment with a corresponding recess 64 formed in the top surface of the member 16 and a compression spring 66 is seated in these two recesses to thereby yieldingly urge the adjacent portions of the movable and fixed jaws away from each other and thereby cause as set forth hereinafter movement of the forward portions of the two jaws towards each other.

A pivotal connection is provided between the two ends of the block 56 whereby the movable jaw is pivotally connected to the fixed jaw. This pivotal connection, as shown best in Figure 6, comprises a U-shaped upper member 70 having a flat base 72 resting upon the top cover member 16 of the fixed jaw 12 and being secured thereto as by the fastening bolts 74. These bolts further serve to secure the members 14 and 16 together which form the insulating covering of the fixed jaw. The upstanding legs 76 of the U-shaped bracket are provided with a transversely disposed bolt or pin 78, which latter lies between the head 52 of the handle member 54 and the base member or block 56 thereof. As will be seen from Figures 4 and 5, the bolt or pin 78 extends through an inclined slot 80 which is formed in the adjacent surfaces of the members 52 and 56 to thus provide a slight lateral and vertical movement of the movable jaw upon the pivotal mounting.

At its forward or outward end the plate 56 of the movable jaw is provided with a vertically extending bore or passage therethrough as at 82 which in turn is intersected by an internally threaded bore 84 receiving a set screw 86 therein. Removably seated in the vertical bore 82 is the stem portion 88 of a retaining pin having a headed portion 90 constituting a retaining portion. The set screw 86 engages the stem 88 and thus retains the latter to the movable jaw.

Carried by the retainer or pin 88 in an electrode holder comprising a disk or cylinder 92 of a suitable dielectric material such as brass or the like. The circumference of this disk is surrounded by a dielectric sleeve 94 of a suitable electrically insulated material. An axial bore 96 extends upwardly into this disk and terminates at its upper end in a conical seating surface 98 against which the enlarged retaining portion 90 of the pin 88 is adapted to seat and engage. It will thus be seen that with the pin received in the axial passage or bore 96, the holder 92 is pivotally secured upon the undersurface of the movable jaw for relative swinging or turning movement with respect thereto. Extending diametrically into the disk 92 and intersecting and crossing the passageway or bore 96 is an opening or transverse bore 100, and a corresponding opening or bore 102 is provided in the insulating sleeve 94 registering therewith. These aligned openings 100 and 102 permit the insertion of an electrode 104 therein as will be apparent from a comparison of Figures 11 and 12 with Figures 4 and 5. It will also be observed that the previously mentioned upstanding portion 26 of the electric terminal 22 is loosely and slidably received in this axial passage or bore 96. The arrangement of the bore 100 is such that when there is no electrode inserted therein, and the two jaws are closed upon each other by action of the spring 66 as shown in Figure 5, the upward end of the portion 26 will lie above the lower side of the transverse bore 100. However, when the spring 66 is compressed and the jaws are open, an electrode 104 may be inserted into the aligned bores 100 and 102, and upon release of the jaws the spring 66 will cause the portion 26 to rise in the axial bore or passage 96 and thereby clamp the electrode against the wall of the bore 100.

It will be observed that when the spring pressure 66 is released, the electrode and its holder 92 may be rotated to various positions of angular adjustment as indicated in Figure 2, and thereafter upon release of the spring 66, the latter will cause the portion 26 of the terminal to not only clamp and retain the electrode in the bore in the holder, but also will lock the holder in the desired rotationally adjusted position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An electrode holder comprising a flat elongated fixed jaw of electrically conductive material having an insulation covering completely enclosing the same, means on one end of the fixed jaw for electrically connecting the same to a source of electrical energy, a terminal flat top pin rising from the other end of said fixed jaw through said insulation covering, an elongated spring loaded movable jaw having a transverse bore in one end, means pivotally mounting the movable jaw intermediate its ends on said covering for movement of said one end of the movable jaw toward and away from said terminal pin, an annular electrode holding disk of electrically conductive material having an axial bore terminating in an upper conical seat and having a diametrical electrode receiving bore therein, and a retaining pin rotatably securing said disk to said end of the movable jaw for rotation of said disk into different angular positions and for sliding of said disk over said terminal pin to clamp an electrode against the top of said terminal pin and against one side of the diametrical bore in said disk in response to movement of said end of the movable jaw towards said terminal pin, said retaining pin being fixed in the bore of said movable jaw and having a flared head in the axial bore of said disk seating against said seat in spaced relation to the diametrical bore in said disk to space said head from an electrode received in said diametrical bore.

2. An electrode holder as in claim 1, said holding disk having a circumferential insulation covering diametrically bored for the extension of an electrode therethrough and through said diametrical bore of said disk.

References Cited in the file of this patent

UNITED STATES PATENTS

| | | |
|---|---|---|
| 2,067,995 | Varner et al. | Jan. 19, 1937 |
| 2,347,880 | Budd | May 2, 1944 |
| 2,372,113 | Opgenorth | Mar. 20, 1945 |
| 2,723,333 | Eversole | Mar. 8, 1955 |